I. H. Newton,
Log Turner.
No. 63,080. Fig 1. Patented Mar. 19, 1867.
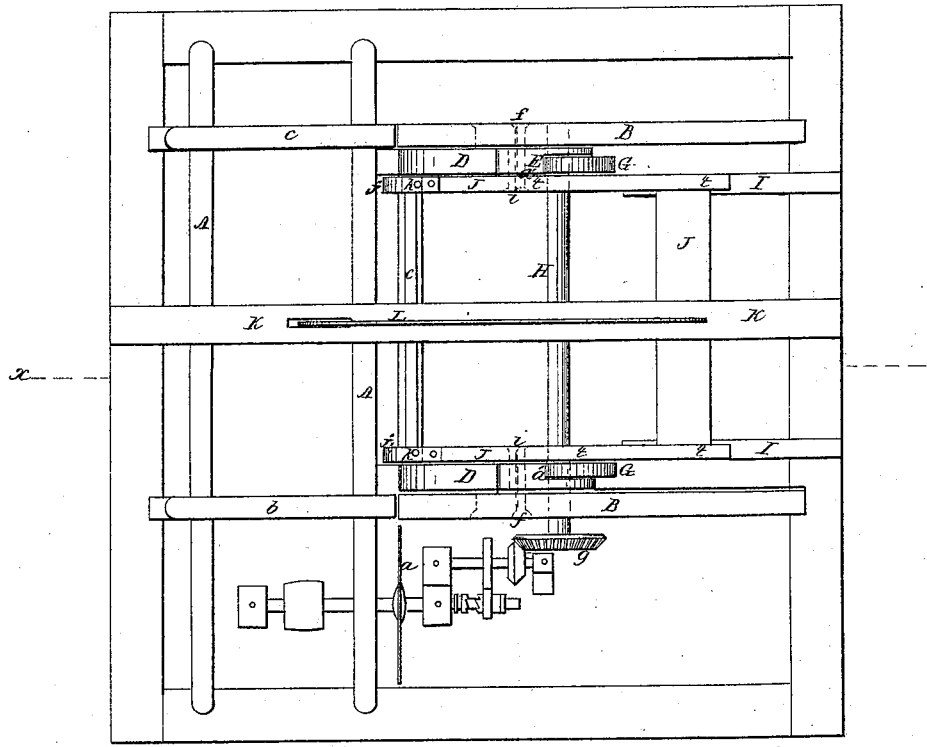
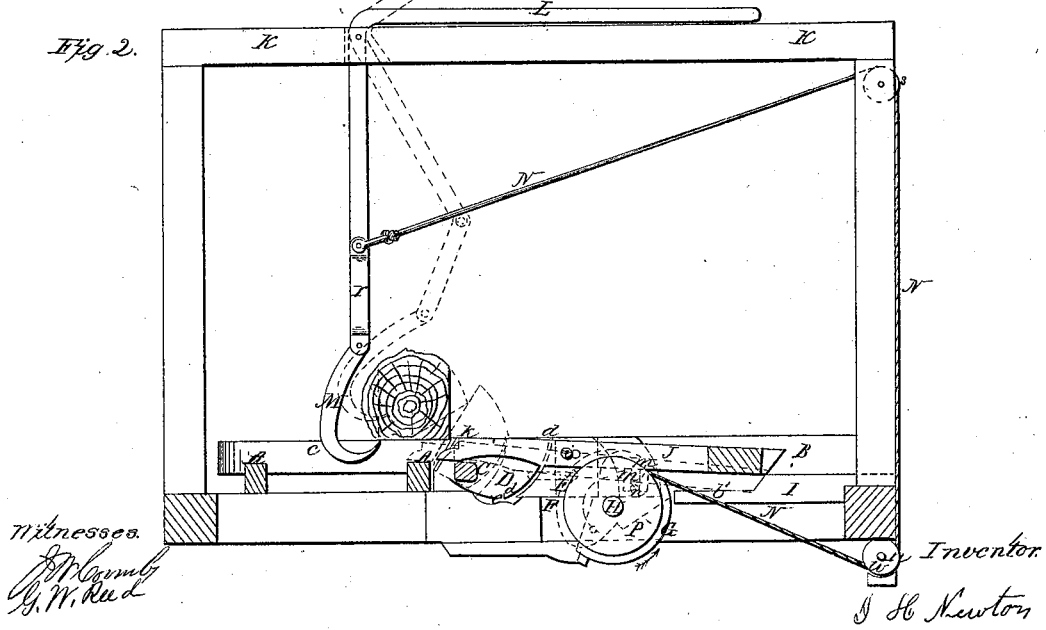
Witnesses
J. H. Newton, Inventor

United States Patent Office.

ISAAC H. NEWTON, OF OAKFIELD, MICHIGAN.

Letters Patent No. 63,080, dated March 19, 1867.

---

IMPROVEMENT IN SAW-MILLS.

---

*The Schedule referred to in these Letters Patent and making part of the same.*

---

TO ALL WHOM IT MAY CONCERN:

Be it known that I, ISAAC H. NEWTON, of Oakfield, in the county of Kent, and State of Michigan, have invented certain new and useful Improvements in Apparatus for Turning Logs in Saw-Mills; and I do hereby declare that the following is a full, clear, and exact description of the same, reference being had to the accompanying drawings, making a part of this specification, in which—

Figure 1 is a plan or top view of an apparatus constructed according to my invention.

Figure 2 is a vertical longitudinal section of the same taken in the line $x\,x$ of fig. 1.

Similar letters of reference indicate corresponding parts in both figures.

This invention is intended more especially for use in that class of saw-mills in which circular saws are employed, and is designed to secure the easy and convenient turning of the logs upon the carriage.

The invention consists in a novel construction of an apparatus whereby the said object is effectually accomplished, and, as a consequence, a great saving of time and labor is effected as compared with the ordinary method of turning the logs.

To enable others to understand the construction and operation of my invention, I will proceed to describe it with reference to the drawings.

The saw-mill carriage is shown at A, and is of the ordinary or of any suitable construction. The position of the circular saw in relation thereto is shown in red color at $a$ in fig. 1, and is such that the innermost ends of the head-blocks $b$ and tail-block $c$ of the carriage will move closely past the same during the operation of sawing the log. Placed in a position transverse to the carriage A, are two horizontal timbers B, the upper surfaces of which are of a nearly equal height with the upper sides or surfaces of the aforesaid head and tail-blocks. A rock-shaft C is situated between these timbers B, at the innermost ends thereof, with its ends working in suitable bearings formed therein. Secured upon each end of this rock-shaft C, at the inner side of the timber in which the said end works, is a block, D, the outer or rearmost end of which is made sloping or cam-shaped, as shown at $d$ in fig. 2, and which is also furnished with a notch or recess $e$ situated at the rearmost part of its under side at the termination of the cam-shaped surface $d$ just described. Situated at the inner sides of the timbers B, immediately behind the blocks D, are two sliding blocks E, which slide upon a horizontal bar, F, or other suitable support, and are provided each with a transverse bolt or pin, $f$, which passes through a longitudinal transverse slot formed in the adjacent timber B, as represented in dotted lines in fig. 2. Each of these sliding blocks E has a shoulder, $a'$, formed near its rearmost or outer end; and acting against this shoulder to push the blocks inward or forward, when desired, is a cam, G. The said cams G are secured upon a rock-shaft, H, which works in bearings, which may be formed in the timbers of the saw-mill below the timbers B. The shaft H is furnished at one end with a cogged wheel, $g$, which may be connected with the arbor of the saw $a$ by suitable intermediate gearing, and by a suitable clutch, as shown in red lines in fig. 2, so as to be turned, when desired, by the rotation of the said saw arbor. I represents two horizontal guides which are situated between the rear or outermost portions of the timbers B, in a position parallel with the said timbers, and at a little distance therefrom, as shown in fig. 1. The inner ends of these guides I are cut away at their upper sides, as shown at $b'$ in fig. 2. J represents a sliding frame, the side pieces $t$ of which are placed close to the inner sides of the blocks D and sliding blocks E, in a position parallel with the same, and pivoted to the sliding blocks E by suitable pins or pivots $i$ passing through short transverse slots in the said side pieces. The outer ends of the said side pieces of the frame J rest upon the guides I, while the forward ends thereof are formed into spurs $j$ made sloping on their upper sides, each of the said ends, also, having a metallic tooth, $k$, attached to the side piece and projecting over the spur $j'$ thereof. Projecting downward from each of the aforesaid side pieces, are two prongs shown in dotted lines at $m$ in fig. 2, which are situated one upon each side of a pin, $n$, which projects inward from each of the cams G. K indicates a horizontal beam which is situated over the parts just described at at any suitable height above the same, and which may be framed into the timbers of the mill in a position transverse to the carriage A. Pivoted in this beam K, at a point above the longitudinal centre of the carriage A, is a bent lever, L, the upper arm of which, when the apparatus is not in use, rests upon the upper side of the said beam. To the extremity of the lower arm of this lever L is attached a hook, M, by means of a link, $r$. N represents a cord, which extends from the extremity of the lower arm of the lever L, over a pulley, $s$, then downward under a similar pulley, $w$, and thence to a wheel, P, which is secured upon the shaft H, the said cord N being so attached to the said wheel that when the shaft H is turned in the direction indicated by the arrow in fig. 2 the end will be wound thereon in such manner as to pull the lower arm of the aforesaid lever L backward to operate the hook M in turning the log, as will be presently fully set forth. When it is desired to turn the log R, which is placed upon the carriage A as shown in fig. 2, the hook M is hooked under the forward side thereof, as shown in the said figure, and the rock-shaft H is brought into gear with the arbor of the saw by means of a clutch or other suitable device, as hereinbefore mentioned, so that the said shaft is caused to make part of a revolution in the direction of the arrow. This movement of the rock-shaft H causes the cams G to force the sliding blocks E forward so that the sliding blocks acting upon the inclined or cam-shaped ends of the blocks D force the said blocks upward into the position shown in red lines in the aforesaid fig. 2, the notches or recesses $e$ thereof fitting upon the upper forward corners of the aforesaid sliding blocks E, in order that the blocks D may be braced against the weight of the log when the said log is tilted over upon the same, as will be hereinafter set forth, and the circular portions of the cams G retaining the said blocks in this position until the log is turned and brought back to its place upon the carriage A. Simultaneously with this movement of the aforesaid blocks the frame J is moved forward by the pins $n$ of the aforesaid cams G, the rearmost end of the said frame sliding upon the elevated or rearmost portions of the guides I, until the spurs $j$ at the forward end thereof pass under the rear edge of the log, but pass into the recesses $b'$ as soon as the teeth $k$ come in contact with the rear side of the log, near the lower edge thereof. Simultaneously with the movements just described of the blocks D and frame J, the partial rotation of the wheel P by winding the cord N upon a portion of its periphery draws the lower arm of the lever L back, and thus brings the hook M upward and backward so as to raise the front side of the log at the same time that the continued forward movement of the frame J pushes the lower side of the log forward, so that the said log is turned or tilted over, its rearmost corner coming in contact with the inclined sides of the blocks D, the weight of the log causing its rearmost side to slide downward upon the inclined sides of the aforesaid blocks; the log being thus moved forward transversely to the carriage, and brought into proper position thereon, with that portion which it is designed to remove by the saw projecting back from the inner or rearmost ends of the head and tail-blocks of the carriage. The office of the spurs $j$ is to insure the striking of the teeth $k$ at a proper distance from the lower edge of the rear side of the log, and that of the said teeth is to prevent the slipping of the forward end of the frame J in pushing the log, as just described. The log being thus properly turned over, the rock-shaft H is disconnected from the saw arbor, whereupon the weight of the upper arm of the lever L causes the said arm to descend, and thus brings the hook end forward away from the log, and at the same time the lower arm of the said lever, by pulling upon the cord N, turns the rock-shaft H in a contrary direction, and thus brings the cams G and sliding blocks E back to their first positions, and also enables the blocks D to resume their horizontal position by their own weight. While the operation of sawing is going on, the hook M may be swung away from the log and hooked into or suspended from any suitable support attached to the frame of the mill, so as to be out of the way during such sawing. Instead of being operated by the saw arbor, as first set forth, the rock-shaft H may be actuated by any other suitable rotating shaft, or, for turning logs of moderate size, may be furnished with a lever of suitable length and be operated by hand.

What I claim as new, and desire to secure by Letters Patent, is—

1. The hook M, suspended from the bent or loaded lever L, in combination with the operating mechanism for turning the log upon the carriage, substantially as herein set forth.

2. The tilting blocks D, furnished with inclined or cam-shaped ends $d$, and combined in relation with the sliding blocks E, and frame J, substantially as herein set forth for the purpose specified.

3. The rock-shaft H, and cams G, in combination with the sliding blocks E, and tilting blocks D, and frame J, substantially as herein set forth for the purpose specified.

4. The arrangement of the bent lever L, hook M, and cord N, with reference to each other and with the wheel P, and rock-shaft H, substantially as herein set forth for the purpose specified.

I. H. NEWTON.

Witnesses:
   A. LE CLERC,
   J. W. COOMBS.